United States Patent
Magnani

Patent Number: 5,964,501
Date of Patent: Oct. 12, 1999

[54] SNAP FIT BUMPER BAR TRAY

[75] Inventor: Thomas J. Magnani, Troy, Ohio

[73] Assignee: Evenflo Company, Inc., Vandalia, Ohio

[21] Appl. No.: 09/177,173

[22] Filed: Oct. 22, 1998

[51] Int. Cl.⁶ .................................................. A47D 15/00
[52] U.S. Cl. .................. 297/174; 297/188.18; 297/188.2
[58] Field of Search ................................. 297/135, 174, 297/188.18, 188.2, 256.15, 487; 108/46; 280/47.38, 47.4

[56] References Cited

U.S. PATENT DOCUMENTS

| | | | |
|---|---|---|---|
| D. 375,601 | 11/1996 | Myers . | |
| 2,867,401 | 1/1959 | Sheahan | 297/135 X |
| 2,875,815 | 3/1959 | Gill | 297/188.18 X |
| 3,143,374 | 8/1964 | Carboni | 297/188.2 |
| 3,335,434 | 8/1967 | Gamon . | |
| 4,453,764 | 6/1984 | Hennessy . | |
| 4,575,149 | 3/1986 | Forestal et al. | 297/188.18 X |
| 4,858,796 | 8/1989 | Roth | 108/46 X |
| 5,382,074 | 1/1995 | Pietra . | |
| 5,458,394 | 10/1995 | Nichols . | |
| 5,662,378 | 9/1997 | Carruth . | |

Primary Examiner—Peter R. Brown
Attorney, Agent, or Firm—Thompson Hine & Flory LLP

[57] ABSTRACT

A removable tray for a stroller is disclosed. The tray is formed with an upper surface in a generally planar configuration. The tray has a peripheral edge extending upwardly therefrom. The peripheral edge has a downwardly extending shroud with a front section and lateral side sections. The tray also has a generally inverted U-shaped skirt extending downwardly from the rearward portion of the upper surface of the tray. The U-shaped skirt has a rearward plate with parallel co-planar lateral sides and a generally parallel central section therebetween angled downwardly and inwardly to be slidably received upon the interior central planar surface of the cross bar. The rearward plate has two forwardly extending tabs for being received in notches formed in the rearward lower edge of the cross bar. The skirt also has a forward plate extending vertically along the majority of its extent with a forwardly extending recess adjacent to each lateral edge thereof for being slidably received upon the ribs of the front surface of the cross bar. Further, the skirt has a pair of rearwardly extending tabs adapted to be received beneath the front edge of the cross bar.

5 Claims, 3 Drawing Sheets

SNAP FIT BUMPER BAR TRAY

BACKGROUND OF THE INVENTION

1. Field of the Invention

The present invention relates to a new and improved stroller system with a removable tray and, more particularly, pertains to increasing the utility of strollers through a readily removable tray for a child's entertainment and convenience.

2. Description of the Prior Art

The use of strollers and trays and other childcare products of known designs and configurations is known in the prior art. More specifically, strollers and trays and other childcare products of known designs and configurations heretofore devised and utilized for the purpose of extending the convenience and utility of childcare products through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of strollers and trays and other childcare products of known designs and configurations. By way of example, U.S. Pat. No. 4,453,764 to Hennessy, issued Jun. 12, 1984, discloses a slip-on tray for an infant seat.

U.S. Pat. No. 5,382,074 to Pietra, issued Jan. 17, 1995, relates to a detachable stroller tray.

U.S. Pat. No. 5,458,394 to Nichols et al., issued Oct. 17, 1995 and assigned on its face to Hasbro, Inc., discloses a tray assembly for a child's seat.

U.S. Pat. No. 5,662,378 to Carruth, issued Sep. 2, 1997 and assigned on its face to Adrain E. Carruth, discloses a car seat with tray for use by children.

Lastly, U.S. Pat. No. Des. 375,601 to Myers, issued Nov. 12, 1996, and assigned on its face to Lorraine Patricia Myers, relates to a handle for shopping cart.

The following expired patent is also of note, that of U.S. Pat. No. 3,335,434 to Gamon, issued Aug. 15, 1967, which discloses a legless chair constructed to provide a wide and stable base for supporting the chair on a bed or the like.

In this respect, the stroller system with a removable tray according to the present invention substantially departs from the conventional concepts and designs of the prior art, and in doing so provides an apparatus primarily developed for the purpose of increasing the utility of strollers through a readily removable tray for a child's entertainment and convenience.

Therefore, it can be appreciated that there exists a continuing need for a new and improved stroller system with a removable tray which can be used for increasing the utility of strollers through a readily removable tray for a child's entertainment and convenience. In this regard, the present invention substantially fulfills this need.

SUMMARY OF THE INVENTION

In view of the foregoing disadvantages inherent in the known types of strollers and trays and other childcare products of known designs and configurations now present in the prior art, the present invention provides a new and improved stroller system with a removable tray. As such, the general purpose of the present invention, which will be described subsequently in greater detail, is to provide a new and improved stroller system with a removable tray and methods which have all the advantages of the prior art and none of the disadvantages.

To attain this, the present invention essentially comprises a new and improved stroller system with a removable tray comprising, in combination, a stroller having a frame with a seat for the receipt of a child and having wheels therebeneath and having a handle thereabove; a generally U-shaped restraining bar having parallel free side arms with interior ends coupled with respect to the stroller frame with a cross bar integrally formed with the side arms and located in front of the seat, the cross bar having an interior surface with co-planar lateral extents and a thickened central extent therebetween thereby forming a central planar surface extending downwardly and inwardly and with angled transition extents between the central extent and the lateral extents, the cross bar also having an exterior surface in a generally vertical planar orientation with two lateral ribs located adjacent to the exterior ends of the bar, the lateral projections being angled downwardly and outwardly with a central notch formed centrally in the center extent of the bar for the releasable locking receipt of an infant carrier; and a tray formed with an upper surface in a generally planar configuration having an essentially oval periphery with a cylindrical recess formed near one edge thereof for the receipt of a beverage container, the tray also having a peripheral edge extending upwardly therefrom, the peripheral edge having a downwardly extending shroud with a front section and lateral side sections, the tray having a generally inverted U-shaped skirt extending downwardly from the rearward portion of the upper surface of the tray, the U-shaped skirt having a rearward plate with parallel co-planar lateral sides and a generally parallel central section therebetween angled downwardly and inwardly to be slidably received upon the interior central planar surface of the cross bar, the rearward plate having two forwardly extending tabs for being received in notches formed in the rearward lower edge of the cross bar, the skirt also having a forward plate extending vertically along the majority of its extent with a forwardly extending recess adjacent to each lateral edge thereof for being slidably received upon the ribs of the front surface of the cross bar and with a pair of rearwardly extending tabs adapted to be received beneath the front edge of the cross bar, the rearwardly extending projections having slots on opposite sides thereof and extending upwardly into the front leg for increased resilience, the central portion of the rearward plate extending downwardly below the adjacent central planar surface of the cross bar for being pulled by a child care provider when removing the tray from the cross bar.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved stroller system with a removable tray which has all the advantages of the prior art strollers and trays and other childcare products of known designs and configurations and none of the disadvantages.

It is another object of the present invention to provide a new and improved stroller system with a removable tray which may be easily and efficiently manufactured and marketed.

It is a further object of the present invention to provide a new and improved stroller system with a removable tray which is of a durable and reliable construction.

An even further object of the present invention is to provide a new and improved stroller system with a removable tray which is susceptible of a low cost of manufacture with regard to both materials and labor, and which accordingly is then susceptible of low prices of sale to the consuming public, thereby making such a stroller system with a removable tray economically available to the buying public.

Even still another object of the present invention is to increase the utility of strollers through a readily removable tray for a child's entertainment and convenience.

Lastly, it is an object of the present invention to provide a removable tray for a stroller. The tray is formed with an upper surface in a generally planar configuration. The tray has a peripheral edge extending upwardly therefrom. The peripheral edge has a downwardly extending shroud with a front section and lateral side sections. The tray also has a generally inverted U-shaped skirt extending downwardly from the rearward portion of the upper surface of the tray. The U-shaped skirt has a rearward plate with parallel co-planar lateral sides and a generally parallel central section therebetween angled downwardly and inwardly to be slidably received upon the interior central planar surface of the cross bar. The rearward plate has two forwardly extending tabs for being received in notches formed in the rearward lower edge of the cross bar. The skirt also has a forward plate extending vertically along the majority of its extent with a forwardly extending recess adjacent to each lateral edge thereof for being slidably received upon the ribs of the front surface of the cross bar. Further, the skirt has a pair of rearwardly extending tabs adapted to be received beneath the front edge of the cross bar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
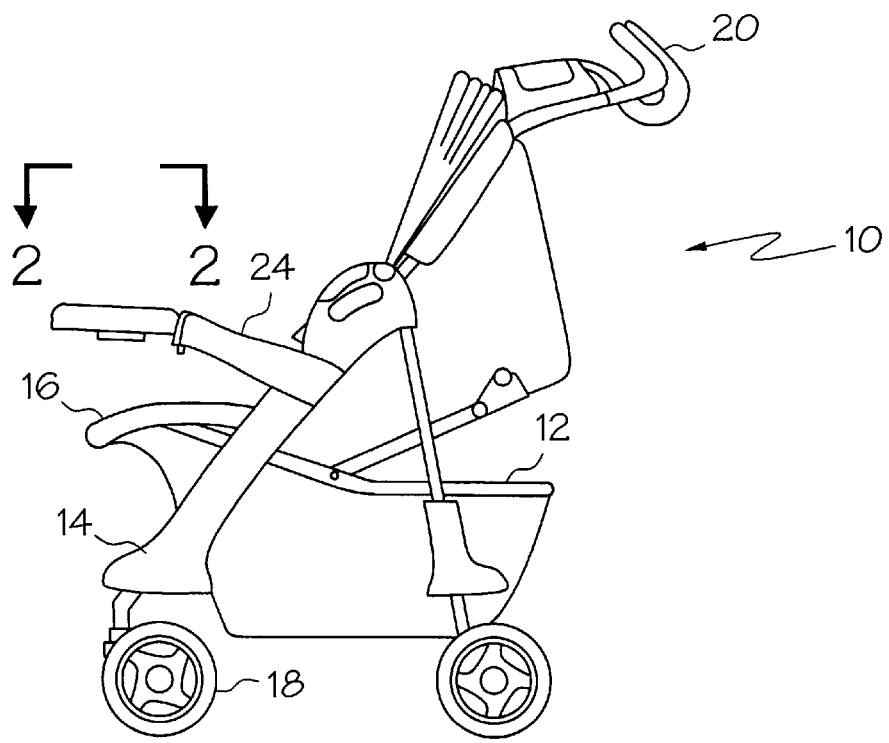
FIG. 1 is a side elevational view of the new and improved stroller system with a removable tray constructed in accordance with the principles of the present invention.
Figure 2:
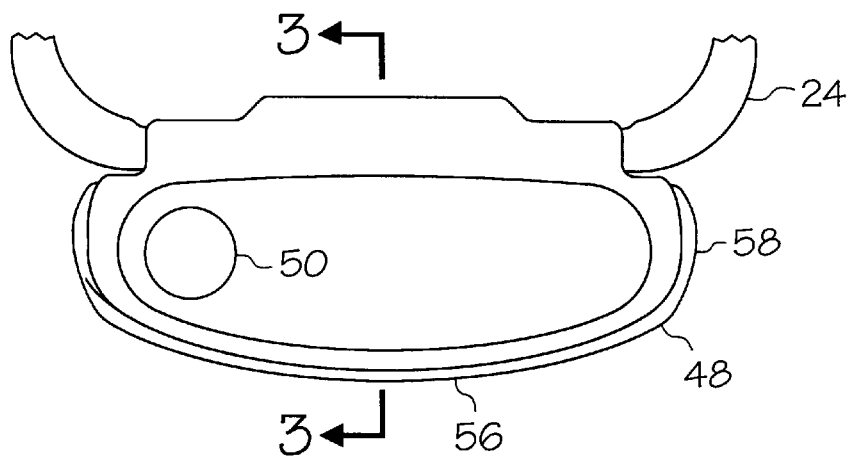
FIG. 2 is a top plan view taken along line 2—2 of FIG. 1.
Figure 3:
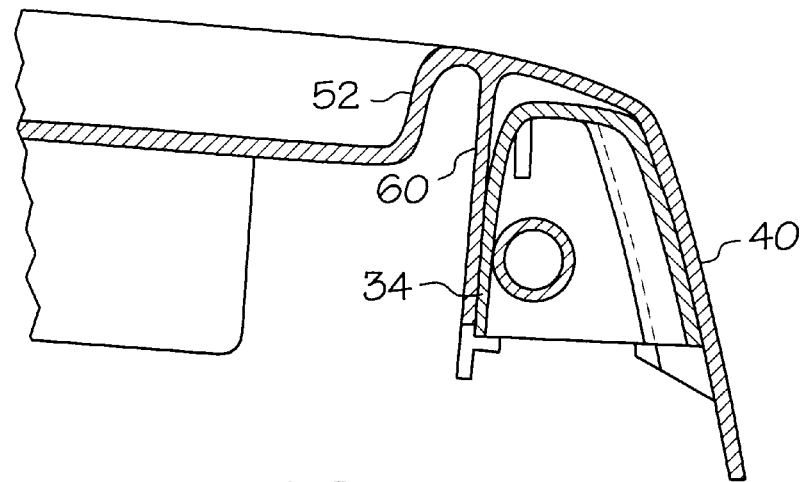
FIG. 3 is a cross-sectional view taken along line 3—3 of FIG. 2.
Figure 4:
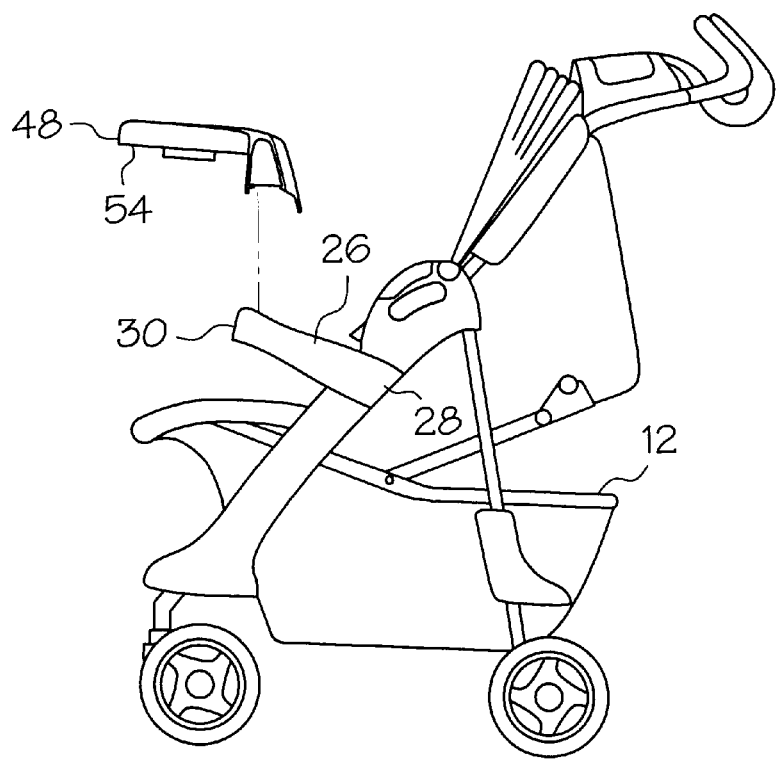
FIG. 4 is a side elevational view of the present invention with the removable tray shown removed from the cross bar.
Figure 5:
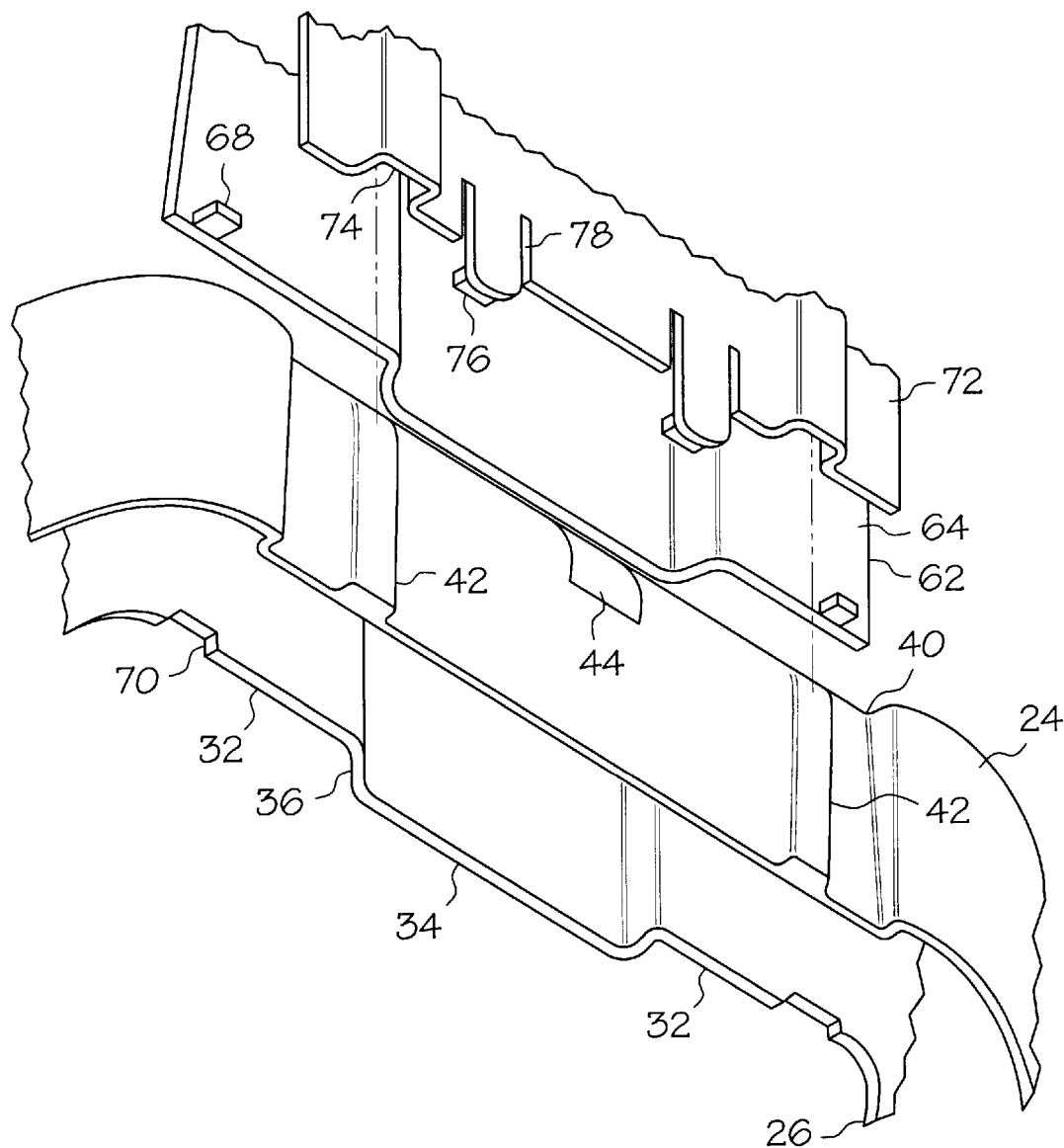
FIG. 5 is an exploded perspective view of a portion of the plate assembly of the present invention.

With reference now to the drawings, and in particular to FIGS. 1 through 5 thereof, the preferred embodiment of the new and improved stroller system with a removable tray embodying the principles and concepts of the present invention and generally designated by the reference numeral 10 will be described.

The present invention, the new and improved stroller system with a removable tray, is a system 10 comprised of a plurality of components. Such components, in their broadest context, include a stroller, a restraining bar, and a tray. Each of the individual components is specifically configured and correlated one with respect to the other so as to attain the desired objectives.

The system 10 incorporates a snap-on tray. The removable tray snaps over the bumper bar of a stroller. The snap fit feature can be tightened or loosened depending on the required removal force.

The first component of the system is a stroller 12. The stroller has a frame 14 with a seat 16 for the receipt of a child. The stroller further includes wheels 18 therebeneath and a handle 20 thereabove.

The second component of the system 12 is a generally U-shaped restraining bar 24. The restraining bar has parallel free side arms 26 with interior ends 28 coupled with respect to the stroller frame. Also provided as part of the restraining bar is a cross bar 30 integrally formed with the side arms and located in front of the seat. The cross bar has an interior surface with co-planar lateral extents 32 and a thickened central extent therebetween. The lateral extents and central extent thereby form a central planar surface 34. The central planar surface extends downwardly and inwardly. It also includes angled transition extents 36 between the central extent and the lateral extents. The cross bar also has an exterior surface 40 in a generally vertical planar orientation. Two lateral ribs 42 are located adjacent to the exterior ends of the bar 24. In this manner, the lateral projections are angled downwardly and outwardly with a central notch 44 formed centrally in the center extent of the bar for the releasable locking receipt of an infant carrier.

The last major component of the stroller system 10 is a tray 48. The tray is formed with an upper surface in a generally planar configuration having an essentially oval periphery. The tray is provided with a cylindrical recess 50 formed near one edge thereof for the receipt of a beverage container. In addition, the tray also has a peripheral edge 52 extending upwardly therefrom. The peripheral edge 52 has a downwardly extending shroud 54 with a front section 56 and lateral side sections 58. Further, the tray has a generally inverted U-shaped skirt 60 extending downwardly from the rearward portion of the upper surface of the tray. The U-shaped skirt has a rearward plate 62 with parallel co-planar lateral sides 64 and a generally parallel central section 66 therebetween angled downwardly and inwardly.

This relationship allows the skirt to be slidably received upon the interior central planar surface 34 of the cross bar. The rearward plate has two forwardly extending tabs 68 for being received in notches 70 formed in the rearward lower edge of the cross bar. The skirt also has a forward plate 72. The forward plate extends vertically along the majority of its extent with a forwardly extending recess 74 adjacent to each lateral edge thereof for being slidably received upon the ribs 42 of the front surface of the cross bar. The forward plate also has a pair of rearwardly extending tabs 76 adapted to be received beneath the front edge of the cross bar. The rearwardly extending projections have slots 78 on opposite sides thereof and extend upwardly into the front leg for increased resilience. The central portion of the rearward plate extends downwardly below the adjacent central planar surface of the cross bar for being pulled by a child care provider when removing the tray from the cross bar. A metal rod interior of the tray at the front end provides rigidity to the plastic material of the tray.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved stroller system with a removable tray comprising, in combination:

a stroller having a frame with a seat for the receipt of a child and having wheels therebeneath and having a handle thereabove;

a generally U-shaped restraining bar having parallel free side arms with interior ends coupled with respect to the stroller frame with a cross bar integrally formed with the side arms and located in front of the seat, the cross bar having an interior surface with co-planar lateral extents and a thickened central extent therebetween thereby forming a central planar surface extending downwardly and inwardly and with angled transition extents between the central extent and the lateral extents, the cross bar also having an exterior surface in a generally vertical planar orientation with two lateral ribs located adjacent to the lateral extents of the bar, the lateral ribs being angled downwardly and outwardly and a central notch is formed centrally in the center extent of the bar for the releasable locking receipt of an infant carrier; and a tray formed with an upper surface in a generally planar configuration having an essentially oval periphery with a cylindrical recess formed near one edge thereof for the receipt of a beverage container, the tray also having a peripheral edge extending upwardly therefrom the peripheral edge having a downwardly extending shroud with a front section and lateral side sections, the tray having a generally inverted U-shaped skirt extending downwardly from a rearward portion of the upper surface of the tray, the U-shaped skirt having a rearward plate with parallel co-planar lateral sides and a generally parallel central section therebetween angled downwardly and inwardly to be slidably received upon the interior central planar surface of the cross bar, the rearward plate having two forwardly extending tabs for being received in notches formed in a rearward lower edge of the cross bar, the skirt also having a forward plate extending vertically along the majority of its extent with a forwardly extending recess adjacent to each lateral edge thereof for being slidably received upon the ribs of the front surface of the cross bar and with a pair of rearwardly extending tabs adapted to be received beneath front edge of the cross bar, the rearwardly extending projections having slots on opposite sides thereof and extending upwardly into the forward plate for increased resilience, the central portion of the rearward plate extending downwardly below the adjacent central planar surface of the cross bar for being pulled by a child care provider when removing the tray from the cross bar.

2. A removable tray for a stroller comprising:

a tray formed with an upper surface in a generally planar configuration, the tray having a peripheral edge extending upwardly therefrom, the peripheral edge having a downwardly extending shroud with a front section and lateral side sections, the tray having a generally inverted U-shaped skirt extending downwardly from a rearward portion of the upper surface of the tray, the U-shaped skirt having a rearward plate with parallel co-planar lateral sides and a generally parallel central section therebetween angled downwardly and inwardly and adapted to be slidably received upon an interior central planar surface of a cross bar of a stroller, the rearward plate having two forwardly extending tabs adapted to be received in notches formed in a rearward lower edge of the cross bar, the skirt also having a forward plate extending vertically along the majority of its extent with a forwardly extending recess adjacent to each lateral edge thereof adapted to be slidably received upon ribs formed in the front surface of the cross bar and with a pair of rearwardly extending tabs adapted to be received beneath the front edge of the cross bar.

3. The tray as set forth in claim 2 wherein the rearwardly extending projections have slots on opposite sides thereof and extend upwardly into the front leg for increased resilience.

4. The tray as set forth in claim 2 wherein the central portion of the rearward plate is adapted to extend downwardly below the adjacent central planar surface of the cross bar for being pulled by a child care provider when removing the tray from the cross bar.

5. The tray as set forth in claim 2 wherein the tray has an essentially oval periphery with a cylindrical recess formed near one edge thereof for the receipt of a beverage container.

* * * * *